UNITED STATES PATENT OFFICE.

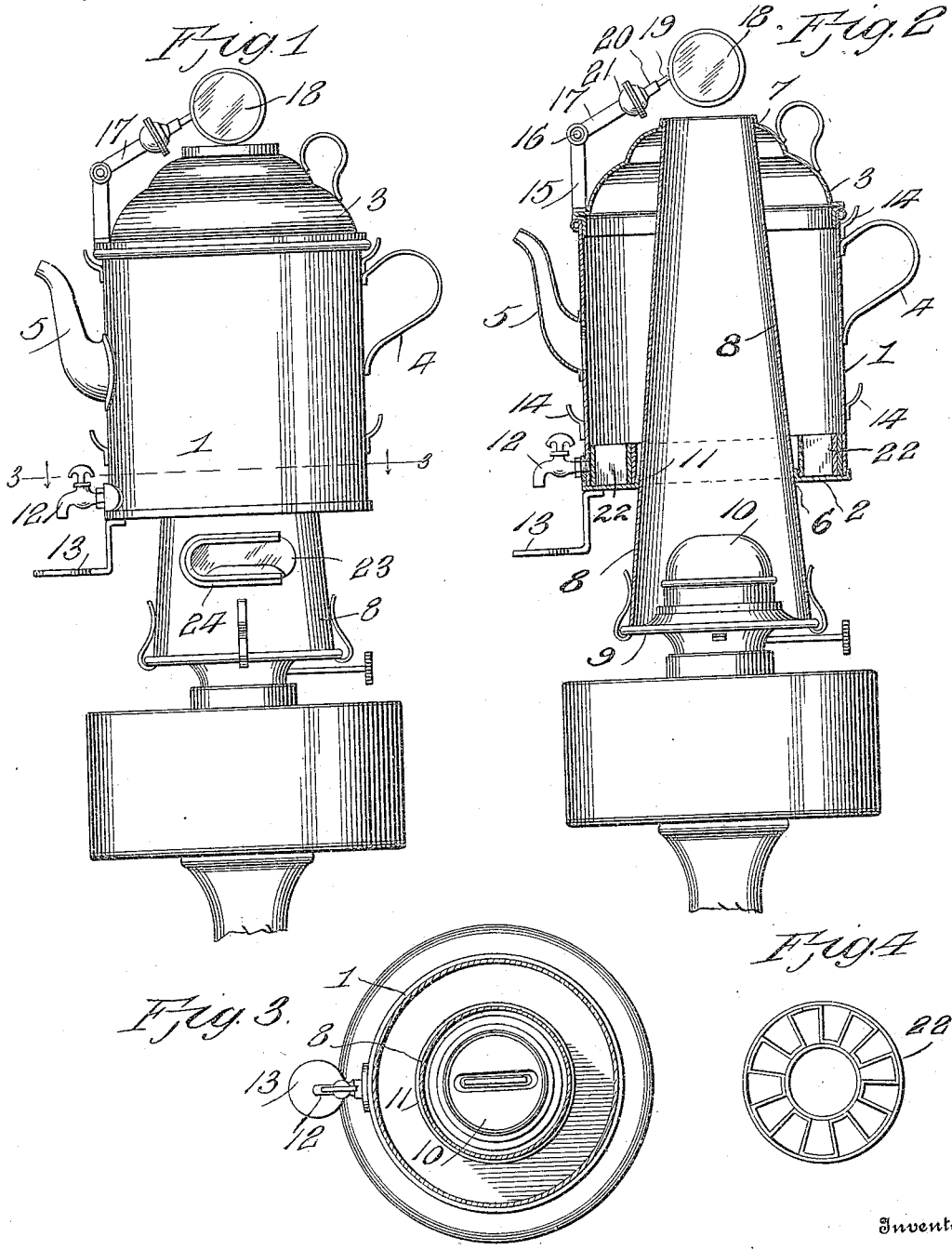

TRAVIS W. STANTON, OF POLLARD, ALABAMA.

COOKING UTENSIL.

952,848.  Specification of Letters Patent.  Patented Mar. 22, 1910.

Application filed February 28, 1908. Serial No. 418,351.

*To all whom it may concern:*

Be it known that I, TRAVIS W. STANTON, a citizen of the United States, residing at Pollard, in the county of Escambia and State of Alabama, have invented new and useful Improvements in Cooking Utensils, of which the following is a specification.

This invention relates to cooking utensils, the object in view being to provide a portable cooking and heating utensil which is applicable to the burner of any ordinary heater, the said utensil embodying a special construction and combination of parts whereby food in liquid or semi-liquid form may be heated or cooked and maintained in heated condition for any desired period of time, the construction of the utensil also adapting it to receive and keep in a heated condition various articles such as bottles, vials and the like.

A further object of the invention is to provide a construction of cooking utensil by means of which clear water may be drawn from the bottom of the utensil and such articles as towels or napkins heated or dried by being hung upon the body of the utensil.

A further object of the invention is to provide means for reflecting the light of the burner and also partially closing the draft flue or chimney so as to regulate the size of the opening through which the product of combustion escapes.

With the above and other objects in view, the nature of which will more fully appear as the description proceeds, the invention consists in the novel construction, combination and arrangement of parts as herein fully described, illustrated and claimed.

In the accompanying drawing:—Figure 1 is a side elevation of the cooking utensil embodying the present invention, shown applied to an ordinary kerosene lamp. Fig. 2 is a central vertical sectional view of the same. Fig. 3 is a cross section on the line 3—3 of Fig. 1. Fig. 4 is a plan view of the rest.

The utensil contemplated in this invention comprises a main body 1 which is preferably cylindrical for the sake of cheapness, said body comprising a closed bottom 2, and a removable lid 3 by means of which the body of the utensil may be filled. The body also comprises a suitable lifting and carrying handle 4 and a main discharge spout 5, the utensil thus far described resembling a coffee or tea pot.

In carrying out the present invention, the bottom 2 is apertured as shown at 6 and the lid 3 is also centrally apertured as shown at 7 while a tapering or conical hollow core 8 extends entirely through the center of the utensil, the smaller end thereof projecting slightly above the top of the lid while the lower and larger end thereof extends to a considerable distance below the bottom of the utensil and is of a size adapting it to fit upon the gallery 9 of an ordinary kerosene lamp or other form of burner indicated at 10. The hollow core 8 is permanently secured at 11 to the bottom of the utensil and forms in effect a chimney for the lamp or other burner when placed in position thereon as clearly shown in Fig. 2.

In addition to the spout 5 the utensil is provided at a low down point with a drain cock or faucet 12 by means of which clear hot water may be drawn off from the bottom of the body 1 while beneath said faucet 12 there is arranged a vessel supporting shelf 13 which is secured to the bottom of the utensil but arranged above the plane of the bottom edge of the core 8 so that the utensil may rest on the core as a support, when the device is not applied to a lamp or burner.

14 designates a series of hooks secured at suitable points to the body 1 and projecting outward therefrom the same being adapted for the support of towels or napkins which may be strung around the utensil and dried.

Projecting upward from the lid 3 is a bracket 15 to which is pivotally connected at 16 a supporting arm 17 which carries at its free end a combined reflector and damper 18 in the form of a disk one side of which is polished or coated with quicksilver to provide the necessary reflecting surface so that when the same is disposed immediately above the upper end of the core 8, it will reflect the light from the burner 10 and notify the attendant as to whether or not the burner is lighted. The combined reflector and damper is provided with a stem or shank 19 slidable in the sleeve 20 of one section of a universal joint 21 formed in the supporting arm 17, which joint enables the reflector 18 to be adjusted to any desired angle that may be required and also to be raised and lowered relatively to the upper end of the core when the latter constitutes a chimney thereby enabling the size of the discharge end of such chimney to be regulated to give the proper draft for the burner.

Removably fitted in the bottom of the utensil 1 is a rest 22 which is shown in plan in Fig. 4, the same consisting of a strip of metal bent into zigzag form and giving a general circular shape so as to fit around the core 11 and within the body 1, the height of said rest being sufficient to support an article such as a bottle above the bottom 2 of the receptacle so that it may be heated by the steam rising from the water contained in the bottom of the utensil.

23 designates a transparent slide fitted in a suitable guide 24 on the core 8 and closing an aperture in the side of the core in line with the burner 10, to enable said burner to be lighted and also to enable the flame to be inspected to ascertain whether or not the burner is working properly.

The utensil hereinabove described will be found of great convenience in the sick room, enabling various articles of diet to be cooked and maintained in a heated condition. It will also be found of great convenience to barbers for maintaining a supply of hot water and enabling the same to be drawn off in small quantities also enabling their towels to be heated and dried in a convenient and expeditious manner.

Having thus described the invention, what is claimed as new, is:—

A cooking utensil for the purpose described consisting of a pot comprising a cylindrical outer shell closed at the top and bottom and provided with a handle and spout, an upwardly tapering hollow core extending centrally therethrough and connected fixedly to said bottom through which it passes, a centrally apertured lid for the utensil fitted to the top thereof and encircling the core, and an annular article supporting rest removably fitted in the bottom of the utensil and bearing against the flat bottom thereof and encircling the hollow core and consisting of a flat strip of metal bent to comprise outer and inner concentric rim portions and radial portions connecting the concentric portions.

In testimony whereof I affix my signature in presence of two witnesses.

TRAVIS W. STANTON.

Witnesses:
 ROY STANTON,
 J. B. KENNEDY.